(12) United States Patent
Hirai (10) Patent No.: US 12,498,620 B2
(45) Date of Patent: Dec. 16, 2025

(54) DRIVE APPARATUS, OPTICAL SYSTEM, AND IMAGE PICKUP APPARATUS

(71) Applicant: CANON KABUSHIKI KAISHA, Tokyo (JP)

(72) Inventor: Yuusuke Hirai, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 18/420,952

(22) Filed: Jan. 24, 2024

(65) Prior Publication Data
US 2024/0255832 A1    Aug. 1, 2024

(30) Foreign Application Priority Data

Jan. 26, 2023 (JP) ................. 2023-010013

(51) Int. Cl.
G03B 13/32 (2021.01)
G03B 11/04 (2021.01)
G03B 17/12 (2021.01)
G03B 17/56 (2021.01)

(52) U.S. Cl.
CPC ............ *G03B 13/32* (2013.01); *G03B 11/041* (2013.01); *G03B 17/12* (2013.01); *G03B 17/565* (2013.01)

(58) Field of Classification Search
None
See application file for complete search history.

(56) References Cited

U.S. PATENT DOCUMENTS

| | | | | |
|---|---|---|---|---|
| 3,940,777 A | * | 2/1976 | Komine | G03B 19/18 396/85 |
| 2010/0226634 A1 | * | 9/2010 | Yamamoto | G02B 7/36 359/698 |
| 2016/0299413 A1 | | 10/2016 | Fee | |

FOREIGN PATENT DOCUMENTS

| | | |
|---|---|---|
| CN | 215867303 U | 2/2022 |
| JP | S6271914 A | 4/1987 |
| JP | 2010139587 A | 6/2010 |
| JP | 2011107334 A | 6/2011 |

* cited by examiner

*Primary Examiner* — Quan Pham
(74) *Attorney, Agent, or Firm* — ROSSI, KIMMS & McDOWELL LLP (57) ABSTRACT

Provided is a drive apparatus to be mounted to a lens apparatus including an operation ring, the drive apparatus including: a drive gear configured to rotate the operation ring; a motor configured to drive the drive gear; a partition wall member arranged between the drive gear and the motor; and a base member configured to accommodate the drive gear, the motor, and the partition wall member. The base member is provided with an opening portion for exposing a part of the drive gear to be opposed to the operation ring. The partition wall member is arranged on a side opposite to the operation ring with respect to the opening portion so as to cover the drive gear and the opening portion.

16 Claims, 9 Drawing Sheets

FIG. 8

DRIVE APPARATUS, OPTICAL SYSTEM, AND IMAGE PICKUP APPARATUS

BACKGROUND OF THE INVENTION

Field of the Invention

The present disclosure relates to a drive apparatus, an optical system, and an image pickup apparatus.

Description of the Related Art

In a lens apparatus including an operation ring for allowing photographing conditions of focusing, zooming, stopping down, and the like to be freely operated, in order to electrically drive the operation ring, a lens drive apparatus is mounted to an outer side of a lens barrel. A coupling gear of the lens drive apparatus meshes with a gear of the operation ring so that the operation ring is electrically driven.

In Japanese Patent Application Laid-Open No. 2010-139587, there is disclosed a lens drive apparatus having a configuration in which a waterproofing sheet member is provided between a drive mechanism unit for driving the coupling gear and a circuit board for controlling the drive mechanism unit, to thereby prevent water from splashing on the circuit board.

However, in the configuration disclosed in Japanese Patent Application Laid-Open No. 2010-139587, there is a fear in that, with the water adhering to each coupling gear meshing with each operation ring of the lens barrel, a motor, a potentiometer, or the like arranged inside the drive mechanism unit may get wet.

SUMMARY OF THE INVENTION

The present disclosure has an object to provide a drive apparatus which is advantageous for reducing entry of water droplets.

In order to achieve the above-mentioned object, according to the present disclosure, there is provided a drive apparatus to be mounted to a lens apparatus including an operation ring, the drive apparatus including: a drive member configured to rotate the operation ring; a motor configured to drive the drive member; a cover member arranged between the drive member and the motor; and an exterior member configured to accommodate the drive member, the motor, and the cover member. The exterior member is provided with an opening portion for exposing a part of the drive member to be opposed to the operation ring. The cover member is arranged on a side opposite to the operation ring with respect to the opening portion so as to cover the drive member and the opening portion.

Further features of the present invention will become apparent from the following description of exemplary embodiments with reference to the attached drawings.

DESCRIPTION OF THE EMBODIMENTS

First Embodiment

Preferred embodiments of the present invention will now be described in detail in accordance with the accompanying drawings. A drive apparatus 1 according to a first embodiment of the present disclosure is described. In each figure, an optical axis direction extending from an image plane side 100a of a lens apparatus 100 to an object side 100b of the lens apparatus 100 is defined as a +X direction, a direction opposite thereto is defined as a −X direction, a vertically upward direction of the lens apparatus 100 is defined as a +Y direction, and a direction opposite thereto is defined as a −Y direction. Further, a horizontal direction of the lens apparatus 100 is defined as a Z direction. For example, in FIG. 1, a right direction of the drawing sheet is defined as a +Z direction, and a left direction of the drawing sheet is defined as a −Z direction.

Figure 1:
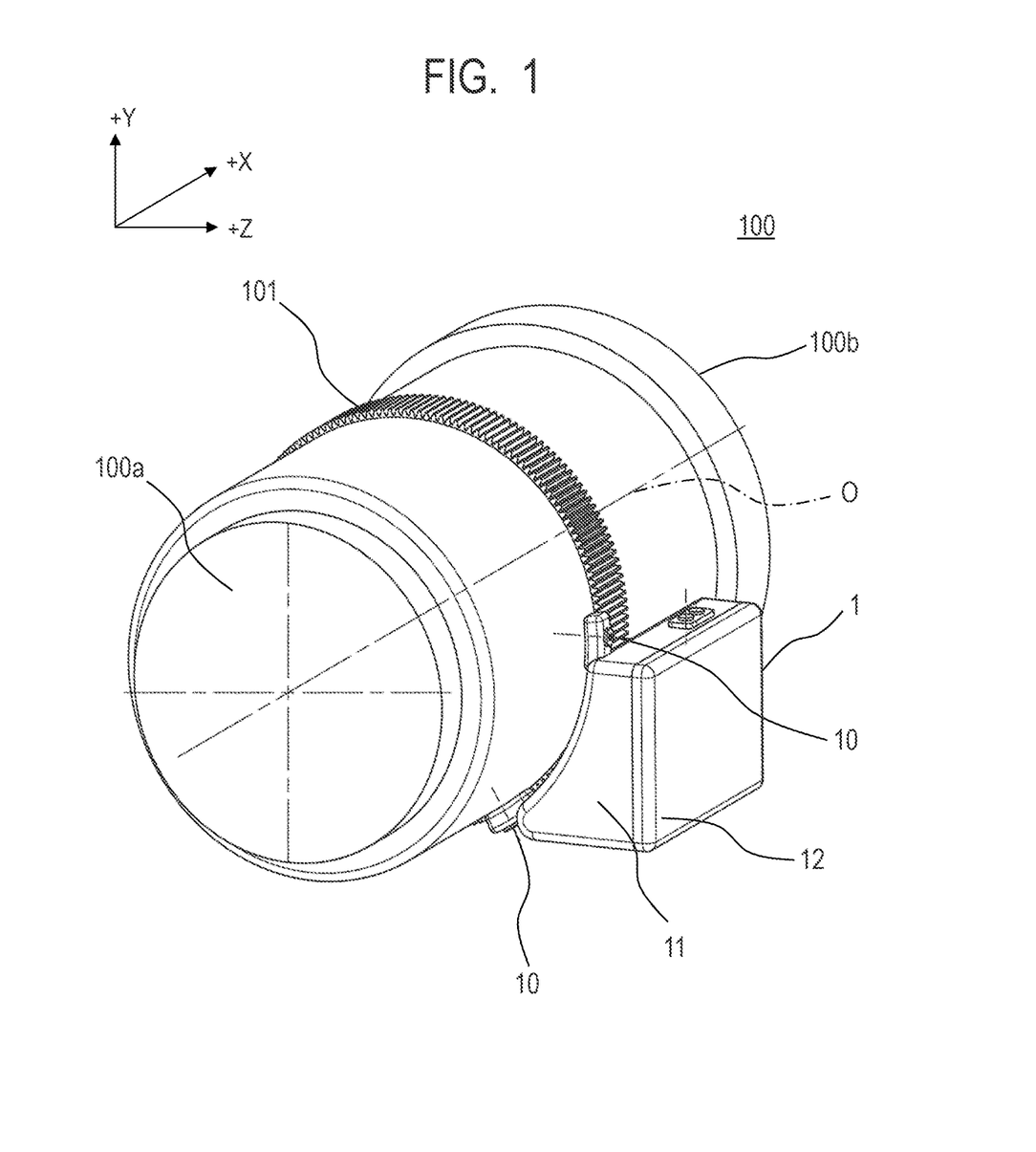
FIG. 1 is a perspective view for illustrating a lens apparatus (100) including a drive apparatus (1) according to a first embodiment.

FIG. 1 is a perspective view for illustrating the lens apparatus 100 including the drive apparatus 1 according to the first embodiment. In the lens apparatus 100 in the first embodiment, an operation ring 101 is provided. The operation ring 101 has a gear for freely setting a photographing condition of zooming through a rotation operation. That is, the drive apparatus 1 is mounted to the lens apparatus 100 including the operation ring 101. Further, an optical system according to an embodiment includes the drive apparatus 1 and the lens apparatus 100. Moreover, a ring gear (not shown) is provided on the operation ring 101. The ring gear has a gear for setting photographing conditions of focusing and stopping down. The operation ring 101 can change at least one of a position of a lens or an opening diameter of a diaphragm in the lens apparatus 100. Further, the operation ring 101 can change the position of the lens at the time of at least one of focusing or zooming. An image pickup apparatus to be described later is removably mounted to the image plane side 100a of the lens apparatus 100.

The drive apparatus 1 is fastened to a fixed exterior surface of the lens apparatus 100, that is, an immovable exterior surface which is not moved by the operation ring 101 or the like, by two fastening members 10. An exterior member of the drive apparatus 1 is mainly formed of a base member 11 and a lid member 12. The base member 11 and the lid member 12 are fastened to each other by a fastening member (not shown). The material of each of the base member 11 and the lid member 12 is a metal or a resin. Further, each of the base member 11 and the lid member 12 is plated or coated.

Figure 2:
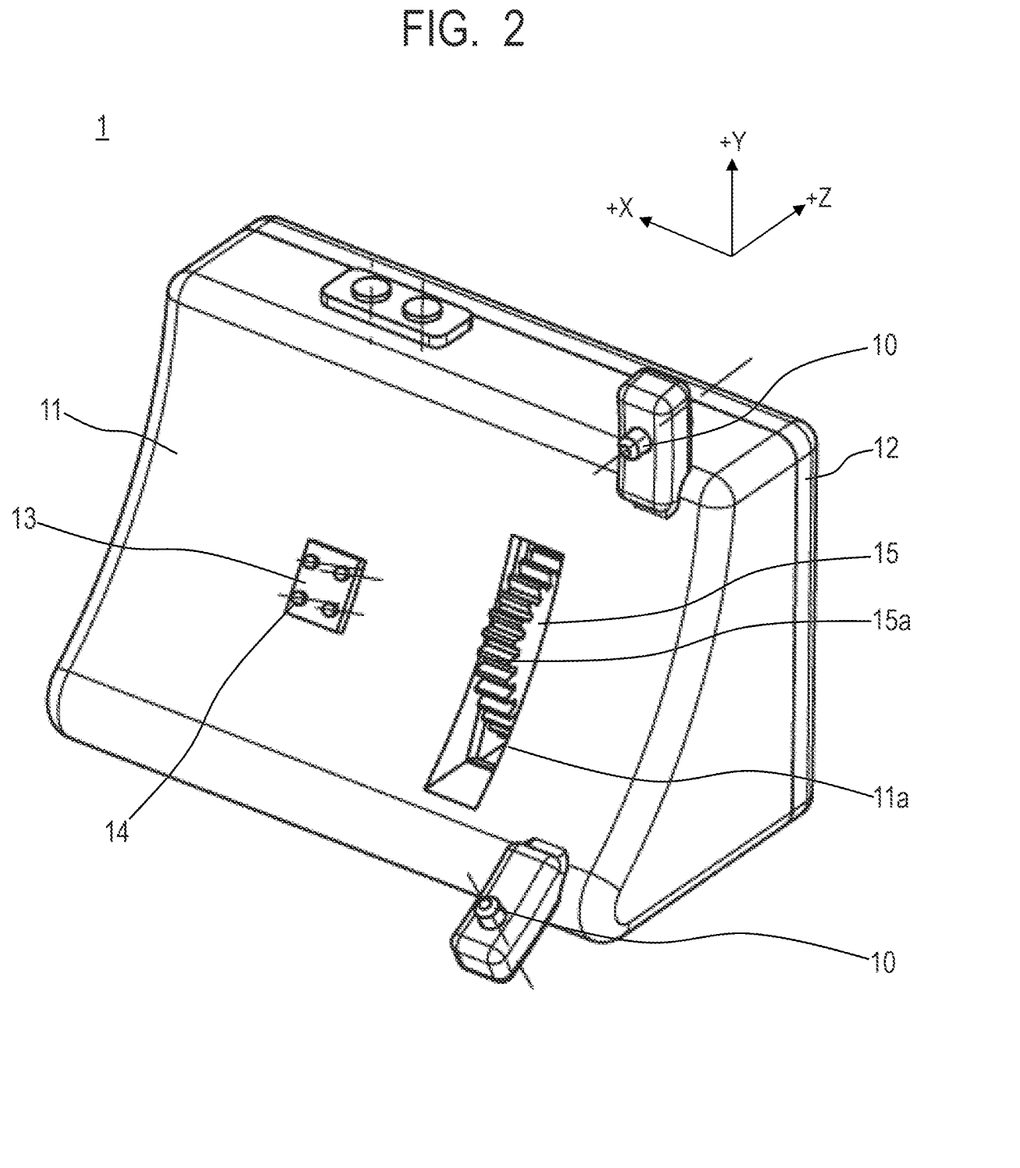
FIG. 2 is a perspective view for illustrating the drive apparatus (1) according to the first embodiment.

FIG. 2 is a perspective view for illustrating a state in which the drive apparatus 1 according to the first embodiment is removed from the lens apparatus 100. A contact terminal block 13, contact pins 14, and an opening portion 11a, which are provided in the drive apparatus 1, are described below. The material of the contact terminal block 13 is a non-conductive resin. The contact terminal block 13 is provided on an exterior surface of the base member 11 on a side to be mounted on the lens apparatus 100. The contact terminal block 13 is fastened to the base member 11 by a fastening member (not shown). As another example, the contact terminal block 13 may be press-fitted and fixed to the base member 11.

On the contact terminal block 13, a plurality of contact pins 14 are provided so as to protrude to the lens apparatus 100 side. The material of each of the contact pins 14 is a metal having a high electrical continuity, and each of the contact pins 14 is press-fitted into the contact terminal block 13. When the contact pins 14 are brought into contact with a terminal portion (not shown) of the lens apparatus 100, power supply from the lens apparatus 100 to the drive apparatus 1 or input/output of a control signal between the lens apparatus 100 and the drive apparatus 1 is allowed so that the drive apparatus 1 can be driven. The contact pins 14 are connected to a substrate 16 to be described later through a wire member 17 or a flexible printed circuit board (FPC) (not shown) so that electrical communication is allowed.

The opening portion 11a is provided in the exterior surface of the base member 11 on the side to be mounted on the lens apparatus 100. From the opening portion 11a, a part of gear teeth 15a of a drive gear 15 (drive member) is exposed to the lens apparatus 100 side. That is, the opening portion 11a exposes a part of the drive gear 15 to be opposed to the operation ring 101. When the drive apparatus 1 is mounted to the lens apparatus 100, the drive gear 15 meshes (engages) with the gear of the operation ring 101 so as to rotate the operation ring 101. Thus, torque of the drive gear 15 driven by a motor can be transmitted to the operation ring 101. The drive gear 15 rotates the operation ring 101 so as to allow at least one of the position of the lens or the opening diameter of the aperture diaphragm in the lens apparatus 100 to be changed. The drive gear 15 rotates the operation ring 101 so as to allow the position of the lens to be changed at the time of at least one of focusing or zooming.

Next, the drive gear 15, the substrate 16, the wire members 17, a drive switch 18, an external terminal 19, a motor 21, a motor mounting member 22, a motor gear 23, a transmission gear 24, a partition wall member 25 (partition member, cover member), and a shaft member 26, which are provided on the base member 11, are described.

Figure 3:
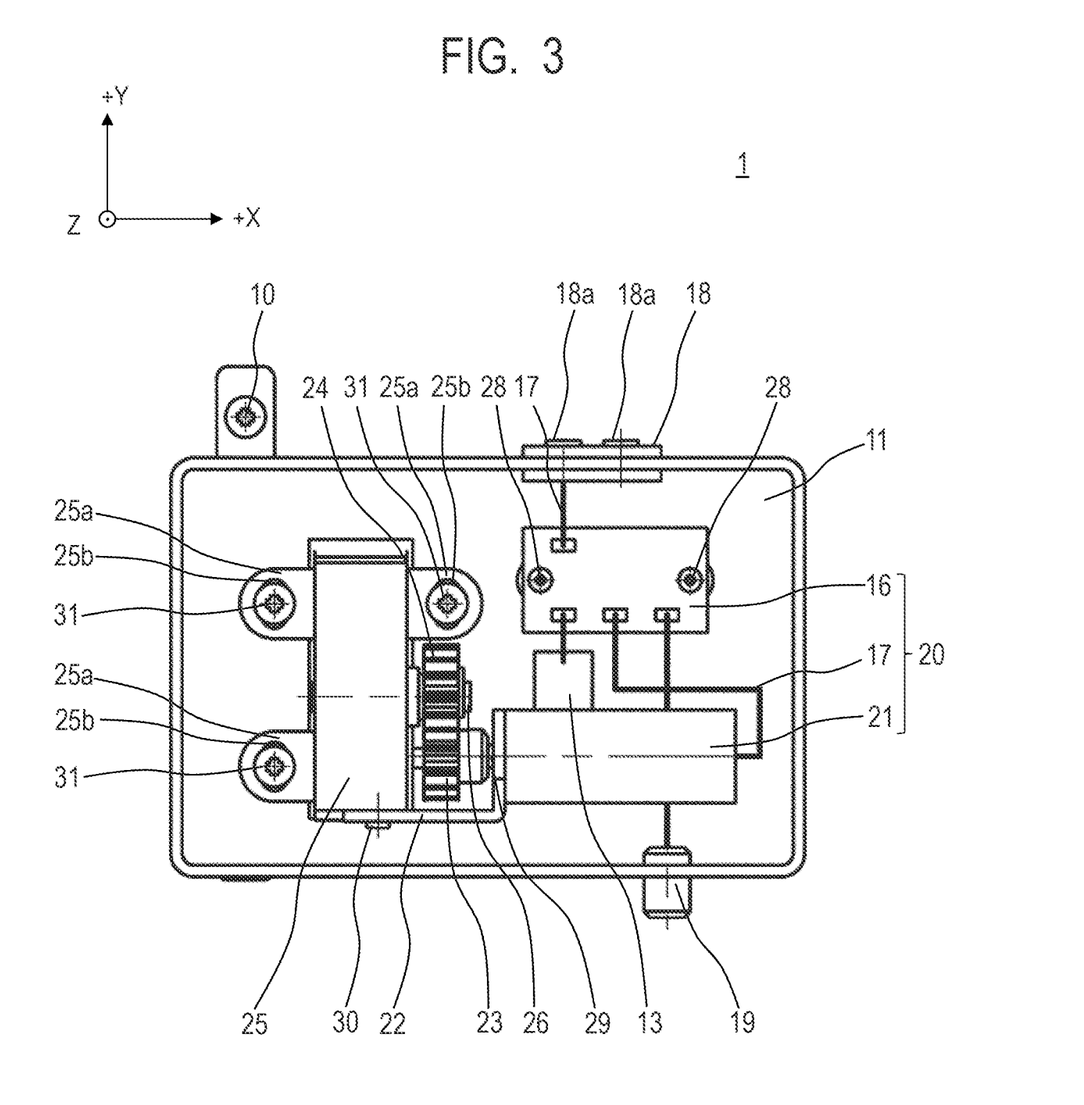
FIG. 3 is a front view for illustrating the interior of the drive apparatus (1) according to the first embodiment.

FIG. 3 is a front view for illustrating an interior configuration of the drive apparatus 1 in a state in which the lid member 12 is removed from the base member 11 in the first embodiment, and shows components arranged in the base member 11. An electrical circuit 20 in the first embodiment includes the substrate 16, the wire members 17, the motor 21, and a detection device (not shown). The substrate 16 has a flat plate shape, and is fixed to the base member 11 by two fastening members 28. A plurality of electrical components in the substrate 16 are connected to each other by the wire member 17 so that communication of an electrical signal is allowed between the plurality of electrical components. The substrate 16 is connected to the contact terminal block 13, the drive switch 18, the external terminal 19, and the motor 21 by a plurality of wire members 17.

The drive switch 18 is fastened to the base member 11 by a fastening member (not shown). Two switch portions 18a are provided on a surface of the drive switch 18. When one of the two switch portions 18a of the drive switch 18 is pressed, the motor 21 operates so that torque is transmitted by each gear group to be described later, thereby being capable of performing a zooming operation on a wide angle side or a telephoto side. That is, the motor 21 connected to the electrical circuit 20 drives the drive gear 15 to rotate. In other words, the electrical circuit 20 drives the drive gear 15.

The external terminal 19 is fastened to the base member 11 by a fastening member (not shown). The external terminal 19 is a connector, and is connected in a male-female relationship to a connector of an external apparatus (not shown). When the external apparatus is connected to the external terminal 19, power supply from the external apparatus to the drive apparatus 1 or input/output of a control signal between the external apparatus and the drive apparatus 1 is allowed, thereby being capable of operating the drive apparatus 1 or the lens apparatus 100.

The motor 21 is fastened to the L-shaped motor mounting member 22 by two fastening members 29. Further, the motor mounting member 22 having the motor 21 fastened thereto is fastened to the partition wall member 25 to be described later by two fastening members 30. In the first embodiment, the motor 21 is fixed to the partition wall member 25 through intermediation of the motor mounting member 22, but the motor 21 may be directly fastened and fixed to the partition wall member 25.

The motor gear 23 is formed into a substantially disc shape having a thickness. Gear teeth are formed on a surface of a radially outer portion of the disc, and a motor shaft of the motor 21 is fitted to a radially inner portion thereof. The motor gear 23 is fastened by causing a distal end of a set screw (not shown) screwed into the motor gear 23 to abut against a D-cut surface provided in the motor shaft. In this manner, the motor gear 23 is rotated integrally with the rotation of the motor shaft.

In the partition wall member 25, two extending portions 25a extending in the −X direction and one extending portion 25a extending in the +X direction are formed. In each of the extending portions 25a, a substantially elliptical-shaped long hole portion 25b (long hole portion) having a major axis in the Y direction is formed. A fastening member 31 is inserted through the long hole portion 25b of the extending portion 25a. The fastening member 31 is fastened so that the partition wall member 25 is fastened to the base member 11. Provision of the long hole portion 25b allows the position of the partition wall member 25, the drive gear 15, or the like to be adjusted in the ±Y directions.

Figure 4:
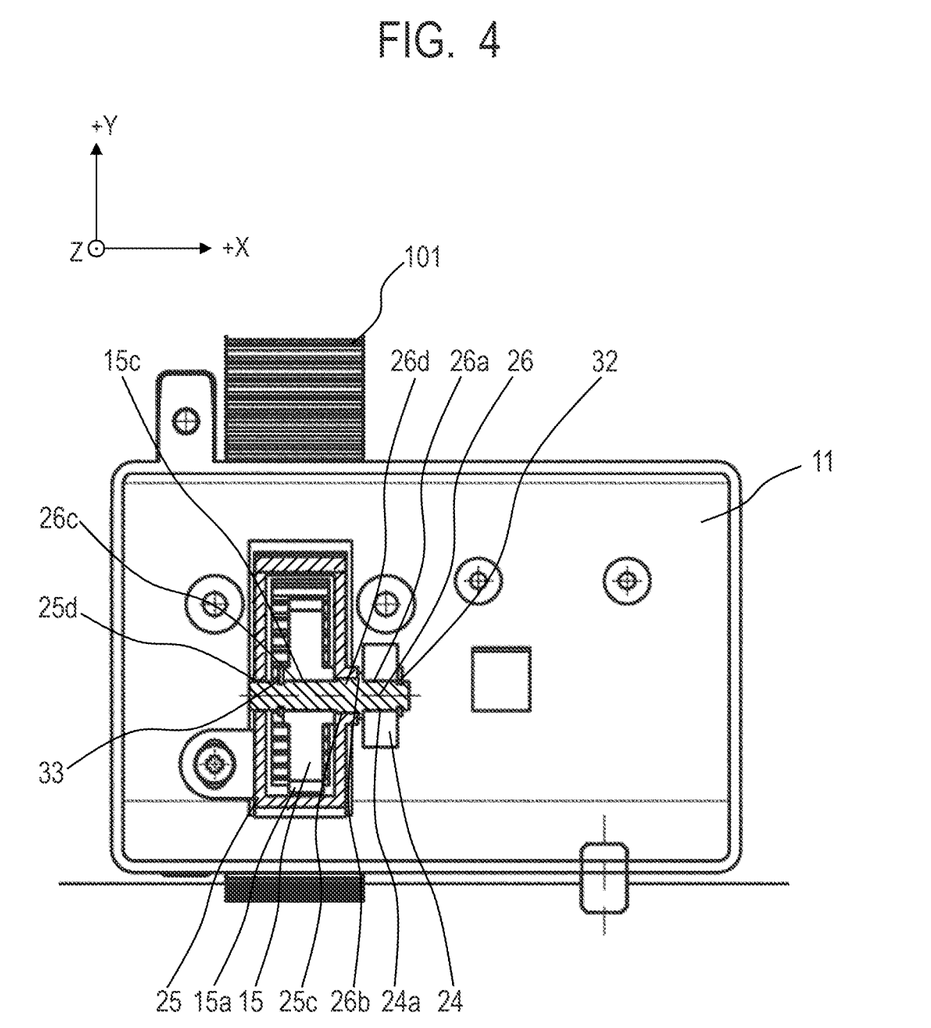
FIG. 4 is a partial cross-sectional view for illustrating the interior of a base member (11) in the first embodiment.

FIG. 4 is a partial cross-sectional view for illustrating the interior of the base member 11 in the first embodiment, and shows, as cross sections, the hatched partition wall member 25 and the hatched shaft member 26 to which the drive gear 15 and the transmission gear 24 are fitted. For ease of understanding, illustration of the electrical circuit 20 and the like is omitted.

The transmission gear 24 is formed into a substantially disc shape having a thickness. Gear teeth are formed on a surface of a radially outer portion of the transmission gear 24, and those gear teeth mesh with the gear teeth of the motor gear 23. In a radially inner portion of the transmission gear 24, an engagement surface 24a in which two opposing sides are formed into flat surfaces (D-cut surfaces are formed at two portions) is formed. Meanwhile, also on a surface of a radially outer portion of the shaft member 26, an engagement surface 26a in which two opposing sides are formed into flat surfaces (D-cut surfaces are formed at two portions) is formed so as to correspond to the engagement surface 24a. When the engagement surface 24a of the transmission gear 24 and the engagement surface 26a of the shaft member 26 are fitted to each other, the rotation of the transmission gear 24 is restricted with respect to the shaft member 26. Further, the movement of the transmission gear 24 in the ±X directions (optical axis direction) is restricted by an E-ring 32 fitted to the shaft member 26 and a flange portion 26b of the shaft member 26. In this manner, the transmission gear 24 and the shaft member 26 are integrally rotated.

The shaft member 26 is formed into a substantially cylindrical shape. When the above-mentioned transmission gear 24 and the above-mentioned drive gear 15 are fitted to the shaft member 26, the shaft member 26 is rotated integrally with the transmission gear 24 and the drive gear 15. The shaft member 26 is rotated to slide with respect to a first fitting portion 25c and a second fitting portion 25d provided in the partition wall member 25. The shaft member 26 and the first fitting portion 25c have a gap of from 0 μm to 20 μm therebetween, and the shaft member 26 and the second fitting portion 25d have a gap of from 0 μm to 60 μm therebetween. The first fitting portion 25c exhibits the main fitting, and the second fitting portion 25d exhibits the auxiliary fitting. Both of the fitting portions have a role of suppressing the shaft runout of the shaft member 26.

Figure 7:
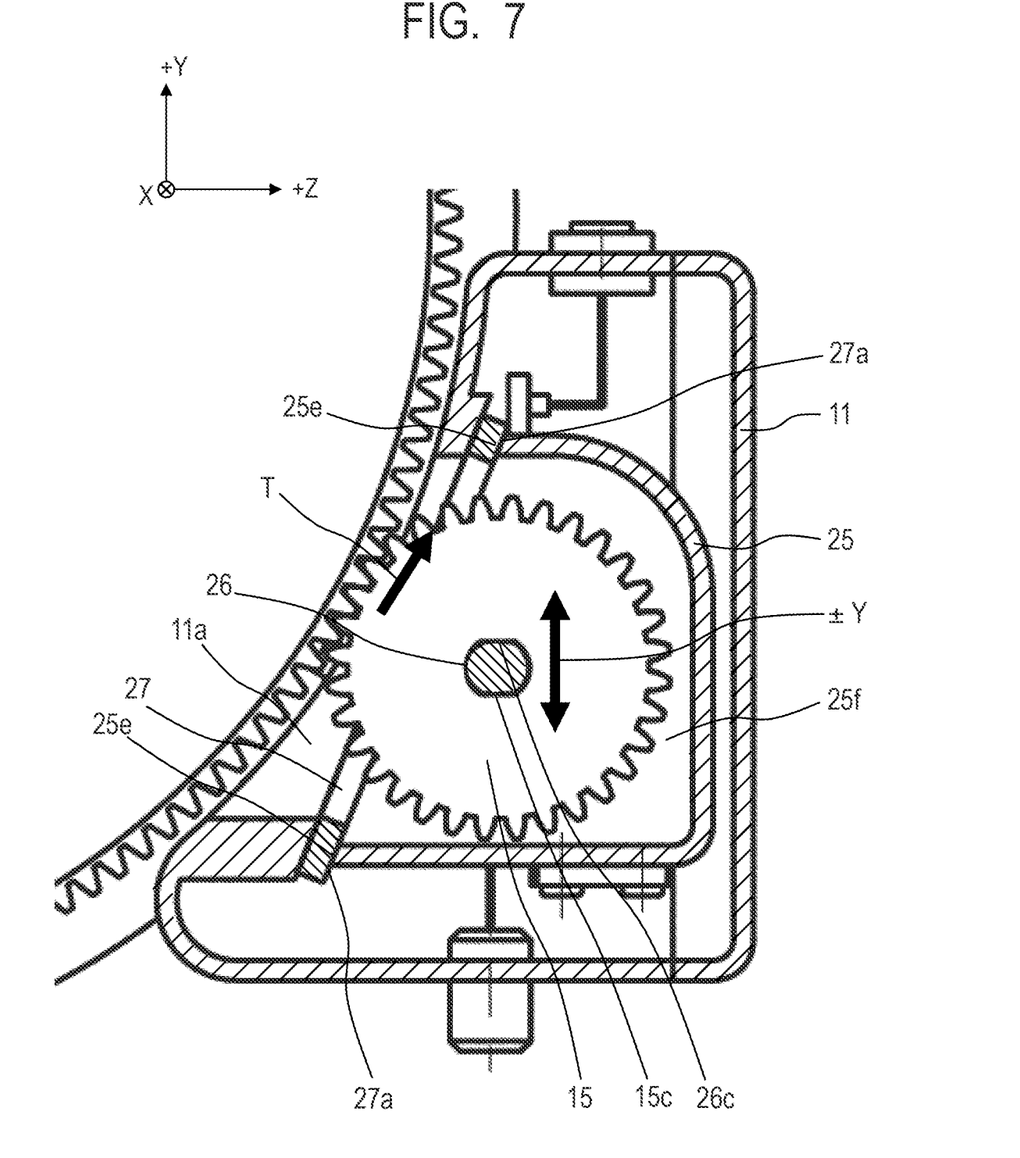
FIG. 7 is a cross-sectional view for illustrating the drive apparatus (2) according to the second embodiment.

The drive gear 15 is formed into a substantially disc shape having a thickness. The gear teeth 15a are formed on a surface of a radially outer portion of the drive gear 15, and those gear teeth 15a mesh with the gear teeth of the operation ring 101. As illustrated in FIG. 7, in a radially inner portion of the drive gear 15, an engagement surface 15c in which two opposing sides are formed into flat surfaces (D-cut surfaces are formed at two portions) is formed. Meanwhile, also on the surface of the radially outer portion of the shaft member 26, an engagement surface 26c in which two opposing sides are formed into flat surfaces (D-cut surfaces are formed at two portions) is formed so as to correspond to the engagement surface 15c. When the engagement surface 15c of the drive gear 15 and the engagement surface 26c of the shaft member 26 are fitted to each other, the rotation of the drive gear 15 is restricted with respect to the shaft member 26. Further, the movement of the drive gear 15 in the ±X directions is restricted by the flange portion 26d and an E-ring 33 fitted to the shaft member 26. With this configuration, the drive gear 15 and the shaft member 26 are integrally rotated.

As described above, with the motor mounting member 22, the motor 21 is integrated with the partition wall member 25. Moreover, the drive gear 15 is fitted to the shaft member 26, and the shaft member 26 is rotatably supported by the first fitting portion 25c and the second fitting portion 25d of the partition wall member 25. In other words, the drive gear 15 is fitted to the shaft member 26 which is rotatably supported by the partition wall member 25. That is, the drive gear 15, the motor 21, the motor mounting member 22, the motor gear 23, the transmission gear 24, the partition wall member 25, the shaft member 26, and the like are integrated with each other to form a drive unit. In addition, a mounting position of the partition wall member 25 with respect to the base member 11 can be adjusted by fastening the fastening members 31 to the long hole portions 25b. Thus, the position of the drive unit can be adjusted through adjustment of the mounting position of the partition wall member 25. That is, the partition wall member 25 is fastened to the base member 11 such that positional adjustment of the drive gear 15 with respect to the operation ring 101 (backlash adjustment between the drive gear 15 and the operation ring 101) is allowed. Further, the drive gear 15 is fitted to the shaft member 26 such that positional adjustment with respect to the operation ring 101 is allowed.

Figure 5A:
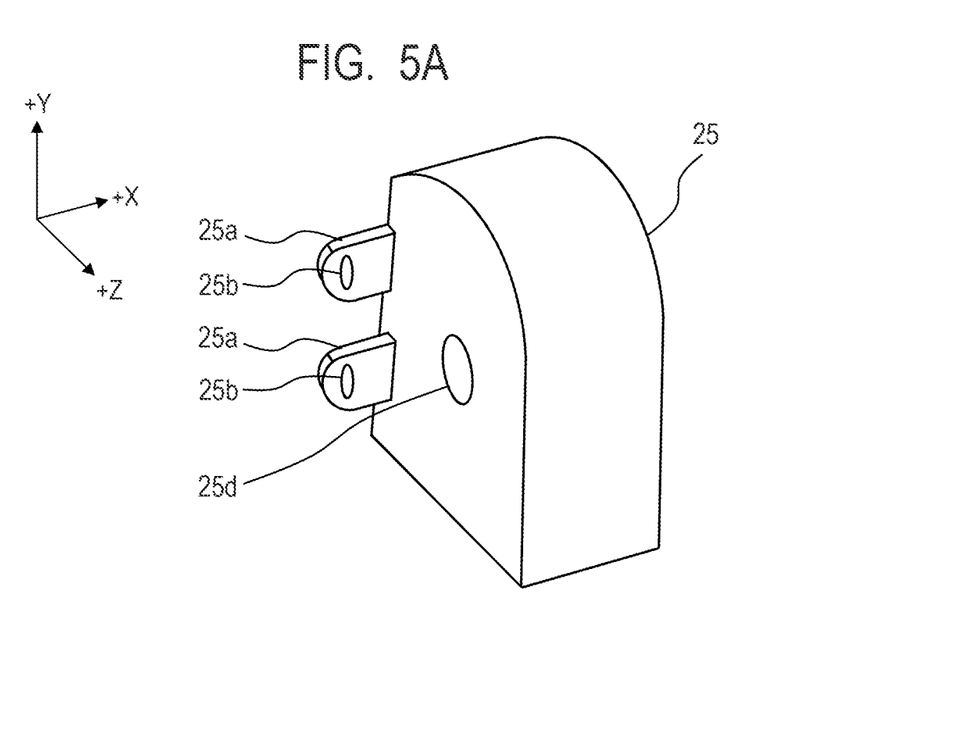
FIG. 5A is a perspective view for illustrating a partition wall member (25) in the first embodiment.
Figure 5B:
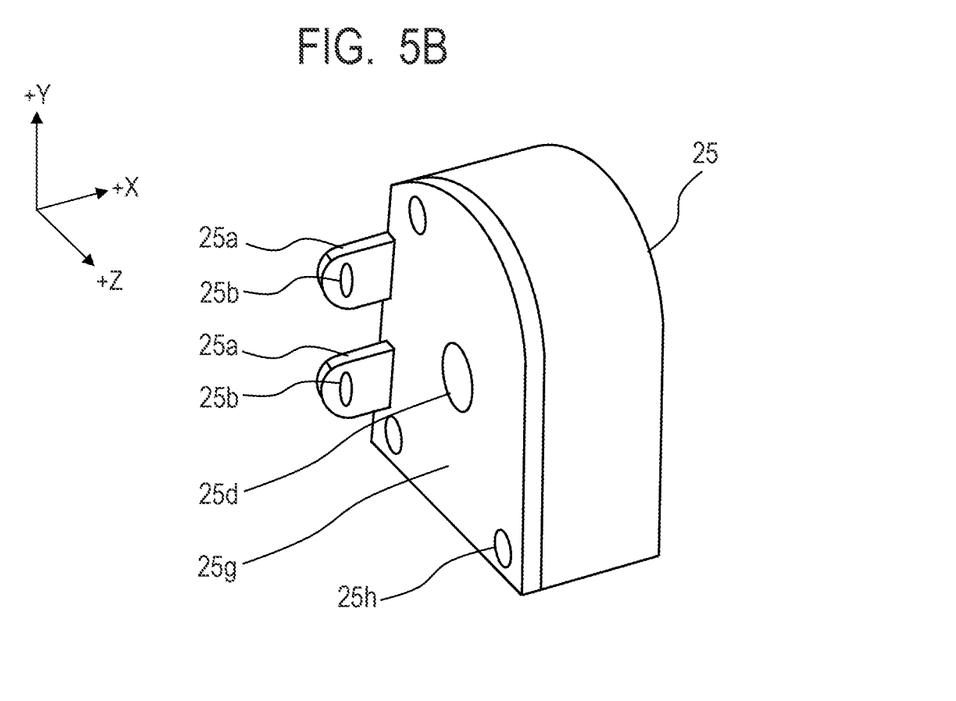
FIG. 5B is a perspective view for illustrating a partition wall member (25) in a modification example of the first embodiment.

FIG. 5A is a perspective view for illustrating the partition wall member 25 in the first embodiment, and FIG. 5B is a perspective view for illustrating the partition wall member 25 in a modification example of the first embodiment. The second fitting portion 25d to which one end portion of the shaft member 26 is to be fitted is formed in one wall surface of the partition wall member 25, and the first fitting portion 25c (not shown) to which another end portion of the shaft member 26 is to be fitted is formed in another wall surface of the partition wall member 25. As in the modification example illustrated in FIG. 5B, the second fitting portion 25d may be formed in a separate member 25g separate from the partition wall member 25, and this separate member 25g may be fixed to the partition wall member 25 by a fastening member or the like. The separate member 25g has three fastening holes 25h formed therein.

With the above-mentioned configuration, the drive gear 15, the electrical circuit 20 (motor 21), the motor gear 23, the transmission gear 24, the partition wall member 25, the shaft member 26, and the like are accommodated in the base member 11. However, the drive gear 15 and a part of the shaft member 26 which is rotatably supported by the partition wall member 25 are exposed to the outside of a casing of the drive apparatus 1. In addition, the partition wall member 25 is arranged in the opening portion 11a of the base member 11, and the partition wall member 25 is fastened to the base member 11. That is, the partition wall member 25 is arranged between the drive gear 15 and the electrical circuit 20 (motor 21), and the partition wall member 25 is arranged so as to cover the drive gear 15 and the opening portion 11a on a side opposite to the operation ring 101 with respect to the opening portion 11a. The partition wall member 25 is not required to completely seal the opening portion 11a, but the partition wall member 25 may be arranged so as to close the opening portion 11a for waterproofing. With this configuration, the partition wall member 25 isolates the motor 21 and the electrical circuit 20 from the drive gear 15. In addition, the amount of water droplets splashing from the opening portion 11a with respect to the substrate 16, the wire members 17, and the motor 21, which are illustrated in FIG. 3, the detection device (not shown), as well as the motor gear 23, the transmission gear 24, and the like is reduced.

For example, when the drive apparatus 1 is used in rainy weather, entry of water droplets from the opening portion 11a of the drive apparatus 1 is suppressed. Accordingly, water droplets are prevented from splashing to the motor 21, the detection device, or the like to prevent occurrence of disturbance of an electrical signal. Further, water droplets are prevented from adhering to a metal portion of a component to prevent occurrence of rust over time, or grease applied to a sliding surface of a drive system is prevented from being removed by the water droplets to prevent reduction in drive performance. That is, there are such effects that disturbance of the electrical signal is reduced, rust on the metal portion of the motor gear 23 or the transmission gear 24 is reduced, removal of grease applied to the sliding surface of the drive system is reduced, and the drive performance is stabilized. With the configuration of the first embodiment, such a simple configuration of covering the drive gear 15 with the partition wall member 25 allows the motor 21, the electrical circuit 20, and the detection device to be prevented from getting wet, and a drive apparatus 1 which is advantageous for reducing entry of water droplets can be provided.

In the drive apparatus 1 described above, gaps communicating to the interior of the drive apparatus 1 from the exterior member are preferred to be as few as possible in order to improve the splash-proof performance, but some gaps may be permitted. For example, the base member 11 and the partition wall member 25 may form an outer wall surface of the drive apparatus 1, and a gap may be formed inside and outside the casing of the drive apparatus 1 corresponding to the outer wall surface. The gap at this time is set to 0.6 mm or less. The reason therefor is because, when the gap is 0.6 mm or less, entry of water droplets to the interior of the drive apparatus 1 is reduced depending on the water surface tension or the water pressure. Further, grease or lubricant serving as a sealing agent may be applied to this gap so that the gap is closed. With reference to FIG. 4, when grease or lubricant is applied to the first fitting portion 25c and the second fitting portion 25d on which the shaft member 26 slides, entry of water from a fitting gap is reduced so that the splash-proof performance is improved. Even when the lens apparatus 100 is used in rainy weather, entry of water droplets to the interior of the drive apparatus 1 can be reduced.

Second Embodiment

Figure 6:
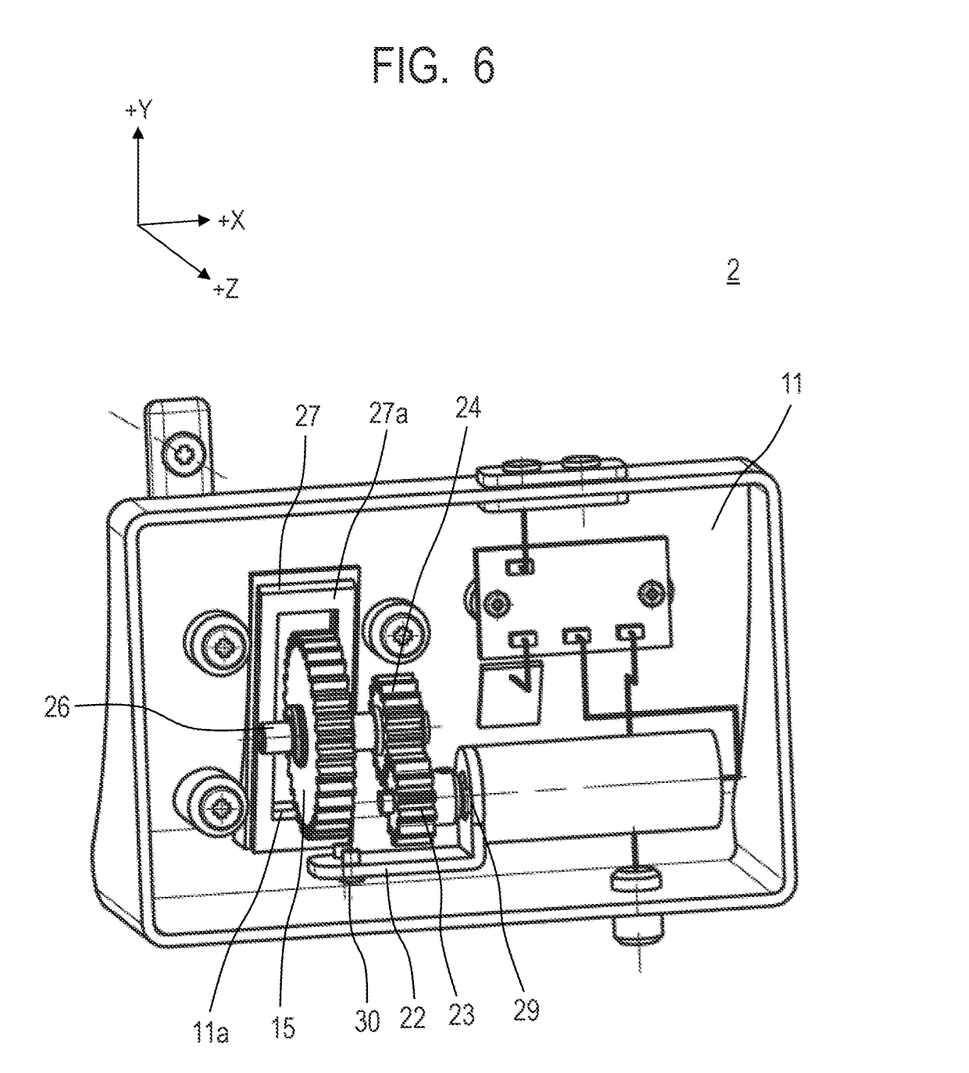
FIG. 6 is a perspective view for illustrating the interior of a drive apparatus (2) according to a second embodiment.

A configuration of a drive apparatus 2 according to a second embodiment is illustrated in FIG. 6. FIG. 6 is a perspective view for illustrating the interior of the drive apparatus 2 according to the second embodiment under a state in which the partition wall member 25 is not shown. Members having the same configurations as those in the first embodiment are denoted by the same reference symbols, and description thereof is omitted. Different configurations are described below.

In the drive apparatus 2 according to the second embodiment, a sealing member 27 is arranged inside the base member 11 along a periphery of the opening portion 11a of the base member 11. The sealing member 27 is formed into a substantially frame shape (flat surface shape) having a flat surface portion 27a, and is fixed through adhesion along the periphery of the opening portion 11a of the base member 11 by double sided tape or the like. As another example, the sealing member 27 may be fixed through adhesion to an inclined surface portion 25e of the partition wall member 25 to be described later. The base member 11 and the partition wall member 25 are in abutment against each other through intermediation of the sealing member 27. The sealing member 27 has a thickness of 0.5 mm or more, and the flat surface portion 27a and the inclined surface portion 25e of the partition wall member 25 are brought into contact with each other so that sealing member 27 is always compressed. The material of the sealing member 27 is a waterproof sponge material containing a silicone rubber, a fluorine rubber, a chloroprene rubber, polyurethane, or the like. As another example, the material of the sealing member 27 is not limited to those materials, and may be a waterproof composite material.

FIG. 7 is a cross-sectional view for illustrating a state in which the drive apparatus 2 according to the second embodiment is fixed to the lens apparatus 100. The inclined surface portion 25e of the partition wall member 25 is brought into abutment against the flat surface portion 27a of the sealing member 27 so that the flat surface portion 27a of the sealing member 27 is compressed in a substantially uniform manner. The drive gear 15 is accommodated in an accommodating portion 25f formed inside the partition wall member 25, and the partition wall member 25 closes the opening portion 11a through intermediation of the sealing member 27 so as to cover the drive gear 15. However, the drive gear 15 and a part of the shaft member 26 which is rotatably supported by the partition wall member 25 are exposed to the outside of a casing of the drive apparatus 2. In addition, the partition wall member 25 is arranged in the opening portion 11a of the base member 11 through intermediation of the sealing member 27, and the partition wall member 25 is fastened to the base member 11. Thus, the partition wall member 25 closes the opening portion 11a through intermediation of the sealing member 27 so as to cover the drive gear 15. With this configuration, the partition wall member 25 isolates the motor 21 and the electrical circuit 20 from the drive gear 15. In addition, the amount of water droplets splashing from the opening portion 11a with respect to the substrate 16, the wire members 17, the motor 21, the detection device (not shown), the motor gear 23, the transmission gear 24, and the like is further reduced.

Thus, in addition to the effects of the first embodiment, an effect of the splash-proof performance can be further enhanced. That is, with the configuration of the second embodiment using the sealing member 27, a drive apparatus 2 which is advantageous for further reducing the entry of the water droplets can be provided.

Also in the configuration of the first embodiment, the backlash between the drive gear 15 and the operation ring 101 can be adjusted, but there is a fear in that water droplets may enter depending on the mounting position of the partition wall member 25. Meanwhile, the configuration of the second embodiment includes the sealing member 27, and hence the entry of the water droplets can be reliably reduced even when the backlash adjustment is performed.

As illustrated in FIG. 3, backlash adjustment in the ±Y directions (see FIG. 7) is allowed within the range of the long hole portion 25b of the partition wall member 25. For example, when the partition wall member 25 is shifted to the +Y direction side, the compression amount of the sealing member 27 is increased, but the abutment between the sealing member 27 and the inclined surface portion 25e is kept. Further, when the partition wall member 25 is shifted to the −Y direction side, the compression amount of the sealing member 27 is decreased, but the abutment between the sealing member 27 and the inclined surface portion 25e is kept.

The sealing member 27 is deformed through positional adjustment of the drive unit including at least the drive gear 15 and the partition wall member 25. In other words, the sealing member 27 is deformable in accordance with the change of the position of the drive gear 15 with respect to the operation ring 101. In addition, as illustrated in FIG. 7, the drive unit including the drive gear 15 is mounted such that positional adjustment is allowed (movement is allowed) in a direction different from a tangential direction T of an outer peripheral surface of the operation ring 101 at a position at which the operation ring 101 engages with the drive gear 15. Further, the partition wall member 25 can be moved integrally with the drive gear 15. That is, the ±Y directions being adjustment directions of the partition wall member 25 during backlash adjustment are directions (angles) different from the tangential direction T of the operation ring 101 at a position at which the operation ring 101 and the drive gear 15 mesh with each other. In other words, the position of the drive gear 15 can be adjusted in a direction different from the tangential direction of the outer peripheral surface of the operation ring 101 at the position at which the operation ring 101 engages with the drive gear 15. In the drive apparatus 2, even when the partition wall member 25 is moved in the ±Y directions so that backlash adjustment is performed, the abutment between the flat surface portion 27a of the sealing member 27 and the inclined surface portion 25e of the partition wall member 25 is kept, and hence the splash-proof performance is kept. Thus, with the configuration of the second embodiment, a drive apparatus 2 which is advantageous for reducing entry of water droplets even at the time of backlash adjustment can be provided.

Further, grease or lubricant serving as a sealing agent may be applied to a surface at which the sealing member 27 and the inclined surface portion 25e of the partition wall member 25 forming the drive unit are brought into contact with each other. In this manner, a coefficient of friction of this contact surface is reduced so that the backlash adjustment is facilitated, and a fine gap at the abutment surface is decreased so that the water entry is reduced and the splash-proof performance is improved. Further, the partition wall member 25 and the sealing member 27 are in abutment against each other through intermediation of the sealing agent.

In the drive apparatus 2 described above, gaps communicating to the interior of the drive apparatus 2 from the exterior member are preferred to be as few as possible in order to improve the splash-proof performance, but some gaps may be permitted. For example, the base member 11, the sealing member 27, and the partition wall member 25 may form an outer wall surface of the drive apparatus 2, and a gap may be formed inside and outside the casing of the drive apparatus 2 corresponding to the outer wall surface. The gap at this time is set to 0.6 mm or less. The reason therefor is because, when the gap is 0.6 mm or less, entry of water droplets to the interior of the drive apparatus 2 is reduced depending on the water surface tension or the water pressure. Further, grease or lubricant serving as a sealing agent may be applied to this gap so that the gap is closed.

Figure 8:
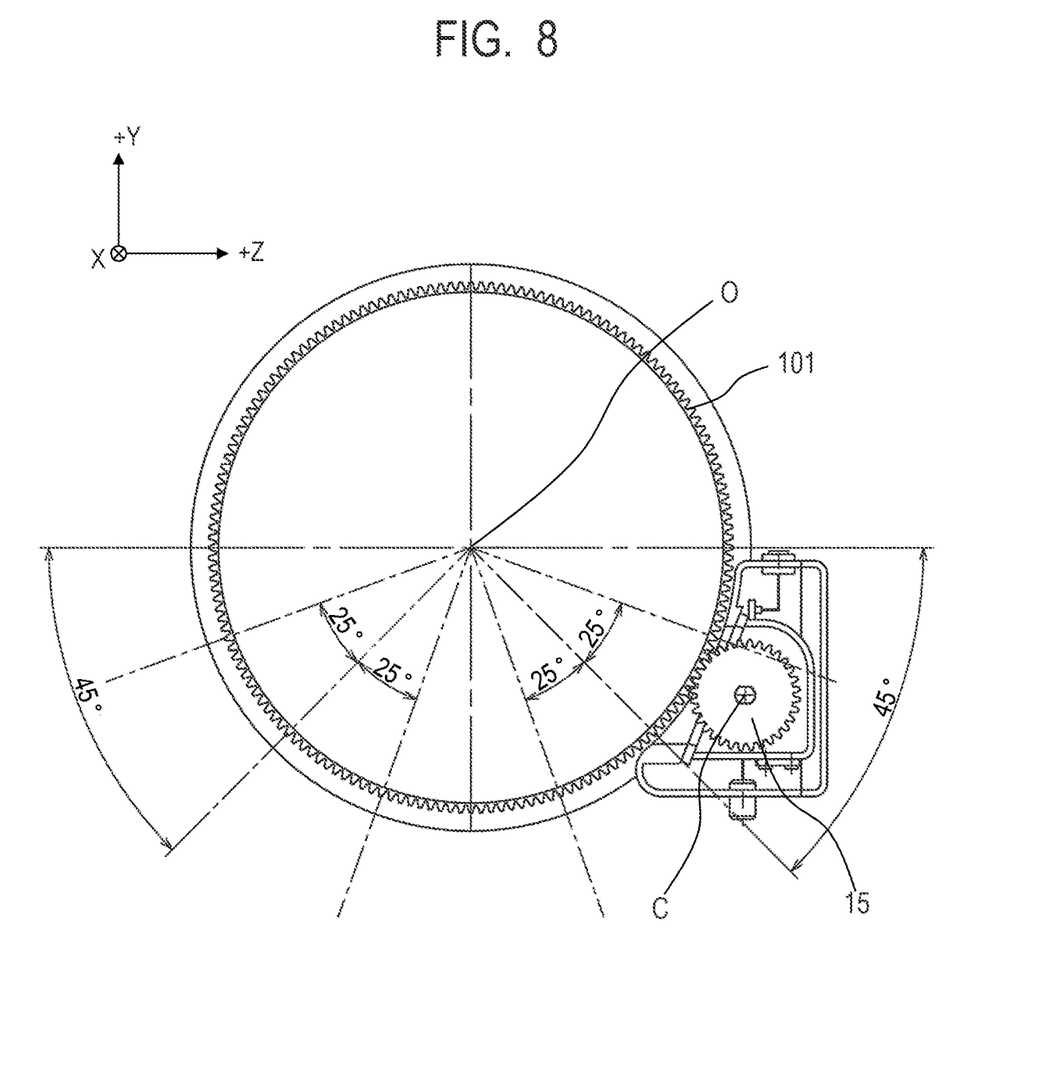
FIG. 8 is a view for illustrating an arrangement of the drive apparatus (2) according to the second embodiment.

Next, a positional relationship of the drive gear 15 with respect to the lens apparatus 100 is described. FIG. 8 is a view for illustrating an arrangement relationship of the drive apparatus 2 and the operation ring 101 in a YZ plane orthogonal to an optical axis O, when viewed in a direction from the image plane side 100a of the lens apparatus 100 to the object side 100b of the lens apparatus 100. In FIG. 8, the drive apparatus 2 according to the second embodiment is mounted to the lens apparatus 100, but the drive apparatus 1 according to the first embodiment may be mounted thereto.

When a state in which a bottom surface of the image pickup apparatus having the lens apparatus 100 mounted thereon is horizontal is referred to as a normal position state of the lens apparatus 100, in regions obtained by equally dividing a periphery of the optical axis O into four quadrants by a horizontal plane and a vertical plane which each pass through the optical axis O, a rotation center C of the drive gear 15 is located in a lower right region or a lower left region. Further, the drive gear 15 is provided in a range in the vicinity of (45 degrees)±(25 degrees) (from 20 degrees to 70 degrees) from the horizontal plane (Z direction).

With regard to the operability of the lens apparatus 100, it is assumed that, when the user rotates the operation ring 101 by hand, the user rotates the operation ring 101 with the hand placed on an upper portion of the lens apparatus 100. When the drive apparatus 2 is provided in, among the four regions (quadrants), the lower right region or the lower left region, the hand and the drive apparatus 2 do not interfere with each other.

When the drive apparatus 2 is arranged in the vicinity of (45 degrees)±(25 degrees) from the horizontal plane (Z direction), at the time of arranging the drive gear 15, the motor 21, the motor gear 23, the transmission gear 24, and the partition wall member 25, a projecting amount in the ±Z directions or in the −Y direction is minimized, which leads to downsizing of the drive apparatus 2.

The drive apparatus 2 may be a sealed casing. The sealed casing is obtained by providing a waterproof member or the like to a mounting surface of each of the drive switch 18, the external terminal 19, and the contact terminal block 13 with respect to the base member 11. In this manner, the splash-proof performance is further improved.

In addition, various components are formed of materials including: a metal member, such as aluminum, magnesium, or brass; a resin member, such as polycarbonate, glass-reinforced polycarbonate, or an ABS (synthetic resin of acrylonitrile, butadiene, and styrene) resin; or a composite material.

Application Example

Figure 9:
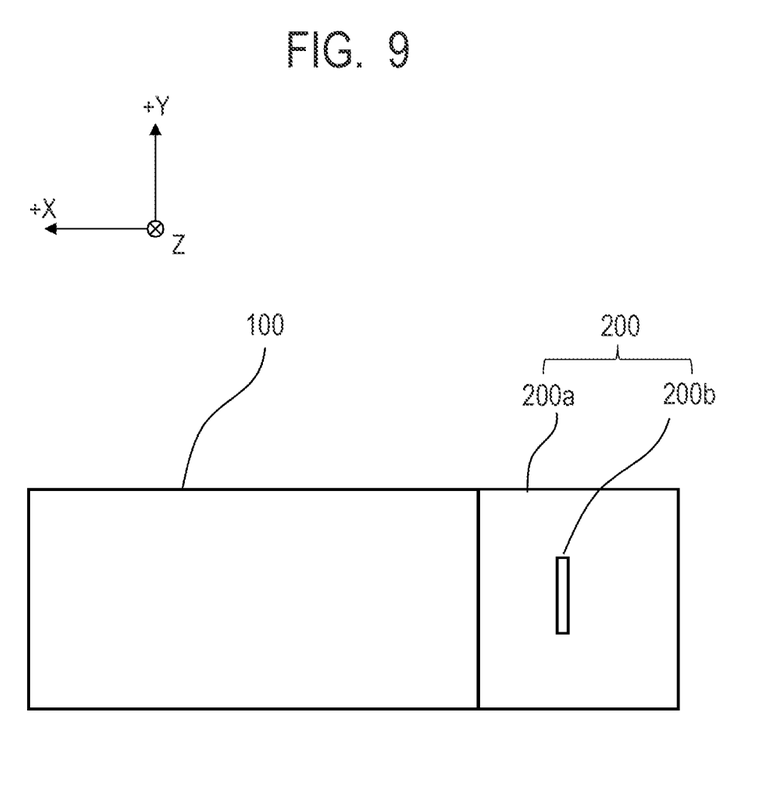
FIG. 9 is a schematic view for illustrating a configuration example of an image pickup system.

FIG. 9 is a schematic view for illustrating a configuration example of a camera apparatus 200 (image pickup apparatus) using the lens apparatus 100 (camera interchangeable lens) to which the present disclosure is applied. The image pickup apparatus includes the lens apparatus 100 and the camera apparatus 200. The lens apparatus 100 includes the drive apparatus 1 or 2. The camera apparatus 200 is formed of a camera main body 200a including an image pickup element 200b for picking up an image formed by the lens apparatus 100. In addition, the image pickup apparatus has a configuration in which the lens apparatus 100 is removably mounted to the camera main body 200a of the camera apparatus 200, but the image pickup apparatus may have a configuration in which the camera main body 200a and the lens apparatus 100 are integrally formed.

The exemplary embodiments of the present disclosure are described above, but the present disclosure is not limited to these embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-010013, filed Jan. 26, 2023, which is hereby incorporated by reference herein in its entirety.

What is claimed is:

1. A drive apparatus to be mounted to a lens apparatus including an operation ring, the drive apparatus comprising:
    a drive member configured to rotate the operation ring;
    a motor configured to drive the drive member;
    a cover member arranged between the drive member and the motor; and
    an exterior member configured to accommodate the drive member, the motor, and the cover member,
    wherein the exterior member is provided with an opening portion for exposing a part of the drive member to be opposed to the operation ring,
    wherein the cover member is arranged on a side opposite to the operation ring with respect to the opening portion so as to cover the drive member and the opening portion, and
    wherein the drive member is fitted to a shaft member which is rotatably supported by the cover member.

2. The drive apparatus according to claim 1, wherein the drive member is fitted to the shaft member such that positional adjustment with respect to the operation ring is allowed.

3. The drive apparatus according to claim 2, wherein the positional adjustment of the drive member is allowed in a direction different from a tangential direction of an outer peripheral surface of the operation ring at a position at which the operation ring and the drive member engage with each other.

4. The drive apparatus according to claim 1, further comprising a sealing member arranged along a periphery of the opening portion,
 wherein the exterior member and the cover member are in abutment against each other through intermediation of the sealing member.

5. The drive apparatus according to claim 4, wherein the sealing member is deformable in accordance with a change of a position of the drive member with respect to the operation ring.

6. The drive apparatus according to claim 5, wherein the drive member is movable in a direction different from a tangential direction of an outer peripheral surface of the operation ring at a position at which the operation ring and the drive member engage with each other.

7. The drive apparatus according to claim 5, wherein the cover member is movable integrally with the drive member.

8. The drive apparatus according to claim 4, wherein the cover member and the sealing member are in abutment against each other through intermediation of a sealing agent.

9. The drive apparatus according to claim 1, wherein the drive member is configured to rotate the operation ring so as to allow at least one of a position of a lens or an opening diameter of an aperture diaphragm in the lens apparatus to be changed.

10. The drive apparatus according to claim 9, wherein the drive member is configured to rotate the operation ring so as to allow the position of the lens to be changed at the time of at least one of focusing or zooming.

11. The drive apparatus according to claim 9, wherein, in regions obtained by equally dividing a periphery of an optical axis of the lens apparatus into four parts by a horizontal plane and a vertical plane which each pass through the optical axis, under a state in which the lens apparatus is brought to a normal position, the drive member is provided in one of a lower right region or a lower left region, and is provided within a range of from 20 degrees to 70 degrees from the horizontal plane.

12. An optical system comprising:
 a lens apparatus including an operation ring; and
 a drive apparatus according to claim 1, mounted to the lens apparatus.

13. An image pickup apparatus comprising:
 the optical system according to claim 12; and
 an image pickup element configured to pick up an image formed by the lens apparatus.

14. A drive apparatus to be mounted to a lens apparatus including an operation ring, the drive apparatus comprising:
 a drive member configured to rotate the operation ring;
 a motor configured to drive the drive member;
 a cover member arranged between the drive member and the motor;
 an exterior member configured to accommodate the drive member, the motor, and the cover member,
 wherein the exterior member is provided with an opening portion for exposing a part of the drive member to be opposed to the operation ring, and
 wherein the cover member is arranged on a side opposite to the operation ring with respect to the opening portion so as to cover the drive member and the opening portion;
 the drive apparatus further comprising a sealing member arranged along a periphery of the opening portion,
 wherein the exterior member and the cover member are in abutment against each other through intermediation of the sealing member.

15. An optical system comprising:
 a lens apparatus including an operation ring; and
 a drive apparatus according to claim 14, mounted to the lens apparatus.

16. An image pickup apparatus comprising:
 an optical system according to claim 15; and
 an image pickup element configured to pick up an image formed by the lens apparatus.

* * * * *